(12) United States Patent
Yu et al.

(10) Patent No.: US 6,483,478 B2
(45) Date of Patent: Nov. 19, 2002

(54) MONOPULSE ARRAY RADAR WITH SINGLE DIFFERENCE BEAM FOR SIMULTANEOUS AZIMUTH AND ELEVATION ANGLE DETERMINATION

(75) Inventors: Kai-Bor Yu, Niskayuna, NY (US); David Jay Murrow, Lake Monticello, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/773,146

(22) Filed: Jan. 31, 2001

(65) Prior Publication Data

US 2002/0135517 A1 Sep. 26, 2002

(51) Int. Cl.[7] ................................................. H01Q 21/00
(52) U.S. Cl. ......................................... 343/853; 342/372
(58) Field of Search .................. 343/756, 850, 343/853; 342/150, 152, 154, 372; H01Q 21/00

(56) References Cited

U.S. PATENT DOCUMENTS

| | | | | |
|---|---|---|---|---|
| 3,714,652 A | | 1/1973 | Grabowski et al. ......... 342/150 |
| 4,088,997 A | | 5/1978 | Winderman .................. 342/150 |
| 5,576,711 A | * | 11/1996 | Morris et al. ................ 342/152 |
| 6,018,311 A | * | 1/2000 | David ......................... 342/196 |
| 6,054,948 A | * | 4/2000 | Dean ........................... 342/372 |

* cited by examiner

Primary Examiner—Tho G. Phan
(74) Attorney, Agent, or Firm—Duane Morris LLP

(57) ABSTRACT

A radar monopulse signal receiving system according to an aspect of the invention provides sum ($\Sigma$) and a single difference ($\Delta$) beam outputs from the beamformer. This is accomplished by encoding the information relating to the azimuth and elevation difference beams onto a single complex number. By comparison with some prior-art arrangements, the number of channels required for processing the signals is reduced. Near the end of the monopulse processing, the quotient is taken of complex number divided by the sum beam information, which directly produces a complex monopulse ratio $m = m_A + jm_E$. The azimuth and elevation monopulse ratios are represented by $m_A$ and $m_E$, respectively.

3 Claims, 6 Drawing Sheets

MONOPULSE ARRAY RADAR WITH SINGLE DIFFERENCE BEAM FOR SIMULTANEOUS AZIMUTH AND ELEVATION ANGLE DETERMINATION

FIELD OF THE INVENTION

This invention relates to radar systems, and more particularly to monopulse radar systems.

BACKGROUND OF THE INVENTION

Monopulse radar systems are widely used for radar surveillance and tracking, and for missile tracking or homing systems.

Monopulse radar systems are advantageous by comparison with the use of single-function surveillance radars combined with altitude-determining radar systems, because a single radar system provides the information required not only to establish the presence of a target in surveillance operation, but also provides the information required to determine both azimuth and elevation angle of the target relative to the boresight of the sum beam. It should be noted that the terms "azimuth" and "elevation" are conventional terms used to designate two orthogonal directions, which are not necessarily associated with true azimuth or true elevation.

FIG. 1 is a simplified block diagram of a prior-art monopulse antenna system using an array antenna. In FIG. 1, the monopulse radar receiving system 10 includes a set 12 of individual antenna elements $12_1$, $12_2$, ... $12_N$. The individual receive antenna elements $12_1$, $12_2$, ... $12_N$ are formed into a receive array having two dimensions. The individual antenna elements $12_1$, $12_2$, ... $12_N$ receive signals reflected from a target, and couple the received signals $r_1$, $r_2$, ..., $r_N$ to various input ports $14i_1$, $14i_2$, ..., $14i_N$ of an analog beamformer 14. Beamformer 14 processes the signals as generally described in conjunction with FIG. 2 to produce analog sum ($\Sigma$) signals, azimuth difference signals ($\Delta_A$) and elevation difference signals ($\Delta_E$). The analog sum signals represent the summation of all the signals received by the array of individual antenna elements. The analog azimuth difference signals represent the difference between the signals received by the antenna elements of the right and left halves of the array of antenna elements, while the analog elevation difference signals represent the difference between the signals received by the antenna elements of the upper and lower halves of the array. The analog sum signals are applied from beamformer 14 to a radio-frequency (RF) receiver illustrated as a block $16^\Sigma$ of a $\Sigma$ processing channel, which performs standard analog receiver functions such as low-noise amplification and or downconversion to an intermediate frequency (IF). The received analog signals from receiver $16^\Sigma$ are applied to an IF receiver $18^\Sigma$ which performs further standard functions such as IF amplification and detection, to produce baseband analog signals. The baseband signals from IF receiver $18^\Sigma$ are applied to an analog-to-digital converter (ADC) $20^\Sigma$, which converts the analog signals into quantized or digital signals representing the signals received by the sum channel. The digital signals from analog-to-digital converter $20^\Sigma$ are applied to conventional sum-channel waveform digital processing illustrated as a block $22^\Sigma$, which produces the processed sum-channel signal for evaluation by a conventional threshold or other detector 24, which evaluates for the presence of absence of a target in the receive sum beam.

The analog azimuth difference signals $\Delta_A$ of FIG. 1 are applied from beamformer 14 to a radio-frequency (RF) receiver illustrated as a block $16^{\Delta A}$ of a $\Delta_A$ processing channel, which performs standard analog receiver functions. The received analog signals from receiver $16^{\Delta A}$ are applied to an IF receiver $18^{\Delta A}$ which performs further standard functions such as IF amplification and detection, to produce baseband analog signals for the $\Delta_A$ channel. The baseband signals from IF receiver $18^{\Delta A}$ are applied to an analog-to-digital converter (ADC) $20^{\Delta A}$, which converts the analog signals into quantized or digital signals representing the signals received by the azimuth difference channel. The digital signals from analog-to-digital converter $20^{\Delta A}$ are applied to conventional azimuth-difference-channel waveform digital processing illustrated as a block $22^{\Delta A}$, which produces the processed azimuth-difference signal for evaluation by a conventional azimuth monopulse ratio detector 26, which evaluates the ratio of the azimuth difference signal to the sum signal to determine the azimuth angle of the target relative to boresight.

The analog elevation difference signals $\Delta_E$ of FIG. 1 are applied from beamformer 14 to a radio-frequency (RF) receiver illustrated as a block $16^{\Delta E}$ of a $\Delta_E$ processing channel, which performs standard analog receiver functions. The received analog signals from receiver $16^{\Delta E}$ are applied to an IF receiver $18^{\Delta E}$ which performs further standard functions such as IF amplification and detection, to thereby produce baseband analog signals for the $\Delta_E$ channel. The baseband signals from IF receiver $18^{\Delta E}$ are applied to an analog-to-digital converter $20^{\Delta E}$, which converts the analog signals into quantized or digital signals representing the signals received by the elevation difference channel. The digital signals from analog-to-digital converter $20^{\Delta E}$ are applied to conventional azimuth-difference-channel waveform digital processing illustrated as a block $22^{\Delta E}$, which produces the processed elevation-difference signal for evaluation by a conventional elevation monopulse ratio detector 30, which evaluates the ratio of the elevation difference signal to the sum signal to determine the elevation angle of the target relative to boresight.

In the arrangement of FIG. 1, the RF receiver blocks and the IF receiver blocks are ordinarily assumed to introduce no perturbation of the received signals, so that the analog signals at the output of the beamformer and the digital signals at the outputs of the analog-to-digital converters can be deemed to be the same, although represented in different form. In the conventional arrangement of FIG. 1, the beamformed signal (either at the beamformer outputs or at the ADC outputs) can be expressed as $$\Sigma = \sum_{k=1}^{N} w_\Sigma(k) r(k) \quad\quad 1$$

$$\Delta_A = \sum_{k=1}^{N} w_{\Delta_A}(k) r(k) \quad\quad 2$$

$$\Delta_E = \sum_{k=1}^{N} w_{\Delta E}(k) r(k) \quad\quad 3$$

where $w_\Sigma$, $w_{\Delta A}$, and $w_{\Delta E}$ are the sum, azimuth-difference and elevation-difference beamforming weights, and $\{r(k)\}$ are the received signals at each antenna element of the array.

As mentioned, the target detection in block 24 of FIG. 1 is conventional, and amounts to some type of thresholding. When a target is identified by block 24, the azimuth and elevation angles of the target, $m_A$ and $m_E$, are determined from a monopulse table look-up $$m_A = Re\left(\frac{\Delta_A}{\Sigma}\right) \quad\quad 4$$

$$m_E = Re\left(\frac{\Delta_A}{\Sigma}\right) \quad\quad 5$$

The corresponding antenna patterns for the sum, azimuth and elevation beams are given by $$g_\Sigma(T_x, T_y) = \sum_{k=1}^{N} w_\Sigma(k)\, \exp\!\left(i2\frac{\pi}{\lambda}(T_x x_k + T_y y_k)\right) \quad\quad 6$$

$$g_{\Delta A}(T_x, T_y) = \sum_{k=1}^{N} w_{\Delta A}(k)\, \exp\!\left(i2\frac{\pi}{\lambda}(T_x x_k + T_x y_k)\right) \quad\quad 7$$

$$g_{\Delta E}(T_x, T_y) = \sum_{k=1}^{N} w_{\Delta E}(k)\, \exp\!\left(i2\frac{\pi}{\lambda}(T_x x_k + T_y y_k)\right) \quad\quad 8$$

where $(T_x, T_y)$ are the direction cosines and $(X_k, Y_k)$ are the antenna element locations.

The adoption of high-speed digital signal processing allowed the morphology or topology of the "principally-analog" monopulse system of FIG. 1 to be adapted for digital beamforming, as illustrated in the simplified block diagram of FIG. 2. In FIG. 2, elements corresponding to those of FIG. 1 are designated by like reference numerals, but in the 200 series. In FIG. 2, the receive portion of the radar system 200 includes set 12 of N antenna elements $12_1$, $12_2$, . . . , $12_N$ as in the case of FIG. 1. The corresponding received signals $r_1, r_2, \ldots, r_N$ are coupled from each receive antenna element of set 12 to a corresponding RF receiver $216_1$, $216_2$, . . . , $216_N$, where the signals are low-noise amplified, filtered, and converted to IF frequency. From RF receivers $216_1, 216_2, \ldots, 216_N$, the analog received signals are coupled to a corresponding set 218 of IF-receivers, including IF receivers 2181, $218_2$, . . . , $218_N$. The IF receivers of set 218 amplify and possibly otherwise process the IF-frequency signals, to produce signals at baseband. The baseband signals from IF amplifier set 218 are applied to corresponding analog-to-digital converters (ADCs) $220_1$, $220_2$, . . . , $220_N$ of a set 220 of ADCs. The digital signals representing the N received signals are applied from the N ADCs of set 220 to the N input ports $214i_1, 214i_2, \ldots, 214i_N$ of digital beamformer 214. Beamformer 214 processes the signals represented by the digital numbers in essentially the same way as the beamformer 214 of FIG. 1, except that beamformer 214 does the processing in digital form, whereas the beamformer of FIG. 1 is an analog apparatus. Beamformer 214 produces digital sum ($\Sigma$) signals, azimuth difference signals ($\Delta_A$) and elevation difference signals ($\Delta_E$). The digital sum signals represent the summation of all the signals received by the array of individual antenna elements, and the digital azimuth difference signals represent the difference between the signals received by the antenna elements of the right and left halves of the array of antenna elements, while the digital elevation difference signals represent the difference between the signals received by the antenna elements of the upper and lower halves of the array, all as in the case of the analog beamformer of FIG. 1.

From the ($\Sigma$), ($\Delta_A$), and ($\Delta_E$) output ports of beamformer 214 of FIG. 2, the digital ($\Sigma$), ($\Delta_A$), and ($\Delta_E$) signals are applied to processing which corresponds to that of FIG. 1, namely the $\Sigma$ signals are applied to a waveform processing block $22^\Sigma$ and thence to a detection block 24, the $\Delta_A$ signals are applied to a waveform processing block $22^{\Delta A}$, and the $\Delta_E$ signals are applied to another waveform processing block $22^{\Delta E}$. Blocks 26 and 30 perform the same functions as that performed in the arrangement of FIG. 1, namely the taking of the ratio of the sum signal $\Sigma$ to the azimuth difference signal $\Delta_A$ and to the elevation difference signal $\Delta_E$, respectively, and from those ratios, looking up the target angle.

FIG. 3 is a simplified representation of the processing which is performed by the analog beamformer 14 of FIG. 1 or by the digital beamformer 214 of FIG. 2. In FIG. 3, beamformer 14, 214 receives $r_1$ signals (from the first antenna element of the array, not illustrated) and couples the signals to three multipliers $310^{\Sigma 1}$, $310^{A1}$, and $310^{E1}$. The $r_2$ received signals are applied to three multipliers $310^{\Sigma 2}$, $310^{A2}$, and $310^{E2}$, and the $r_N$ received signals are applied to three multipliers $310^{\Sigma N}$, $310^{AN}$, and $310^{EN}$. Multipliers $310^{\Sigma 1}$, $310^{\Sigma 2}$, and $310^{\Sigma N}$ are associated with the $\Sigma$ beam of the system, multipliers $310^{A1}$, $310^{A2}$, and $310^{AN}$ are associated with the $\Delta A$ beam, and multipliers $310^{E1}$, $310^{E2}$, and $310^{EN}$ are associated with the $\Delta E$ beam. Each multiplier also receives a weight for weighting the return signals flowing through the multiplier. More particularly, multipliers $310^{\Sigma 1}$, $310^{\Sigma 2}$, . . . , and $310^{\Sigma N}$ are associated with weights $W_1^\Sigma$, $W_2^\Sigma$, . . . , and $W_N^\Sigma$, respectively; multipliers $310_{A1}$, $310^{A2}$, . . . , and $310^{AN}$ are associated with weights $W_1^{\Delta A}$, $W_2^{\Delta A}$, . . ., and $W_N^{\Delta A}$, respectively, and multipliers $310^{E1}$, $310^{E2}$, . . ., and $310^{EN}$ are associated with weights $W_1^{\Delta E}$, $W_2^{\Delta E}$, . . . , and $W_N^{\Delta E}$, respectively. The multipliers multiply the $r_1$, $r_2, \ldots, r_N$ signals by the various weights to produce signals which are summed. The weighted signals produced by multipliers $310^{\Sigma 1}$, $310^{\Sigma 2}$, . . . , and $310^{\Sigma N}$ are summed by a summing circuit $312^\Sigma$ to produce the $\Sigma$ signal at the output of the beamformer 14, 214, the weighted signals produced by multipliers $310^{A1}$, $310^{A2}$, . . . , and $310^{AN}$ are summed together by a summing circuit $316^A$ to produce the $\Delta A$ signal, and the weighted signals produced by multipliers $310^{A1}$, $310^{A2}$, . . . , and $310^{AN}$ are summed together by a summing circuit $312^E$ to produce the $\Delta E$ signal.

Improved monopulse systems are desired.

SUMMARY OF THE INVENTION

A radar return signal detection system according to an aspect of the invention is for determining the presence of a target and for determining the azimuth and elevation angles of arrival of the return signal from the target according to an aspect of the invention includes an array of receiving antenna elements for receiving the return signal. This array is preferably a two-dimensional array of elemental antennas. The system also includes a combination of (a) analog-to-digital conversion means and (b) a beamformer. The combination is coupled to each of the antenna elements for receiving signals representative of the return signal. The combination also includes two beamforming ports at which digital first and second signals are produced, with the first signal representing a sum beam and the second signal representing a difference beam. The second signal is in the form of a complex number in which the azimuth difference and the elevation difference information are encoded. The system also includes digital sum signal processing means coupled to the combination for receiving the first signal, and for generating a sum signal indication for determining the presence or absence of a target. A digital difference signal processing means is coupled to the combination for receiving the complex number, and processing the first signal with the complex number to produce the azimuth and elevation angles. In a particularly advantageous embodiment of the invention, the complex number is divided by the sum signal to produce a further complex number in which the real component corresponds to the azimuth monopulse ratio, and in which the imaginary component corresponds to the elevation monopulse ratio.

In one embodiment of the invention, the beamformer is an analog beamformer for receiving analog signals from the antenna elements and for producing the first and second signals in analog form, and the analog-to-digital conversion means comprises first and second analog-to-digital converters coupled to the beam output of the analog beamformer for converting the analog first and second signals into digital form.

In another embodiment of the invention, the analog-to-digital conversion means comprises a plurality of analog-to-digital converters equal in number to the number of the receiving antenna elements in the array, with each of the analog-to-digital converters coupled to one of the receiving antenna elements, for converting analog signals received by each of the receiving antenna elements into digital form. In this embodiment, the beamformer is a digital beamformer coupled to the plurality of analog-to-digital converters, for generating the digital first and second signals from the digital signals produced by the analog-to-digital converters.

DESCRIPTION OF THE INVENTION

According to an aspect of the invention, a radar system includes a monopulse return signal receiving and processing portion which produces beams for target detection, and which also determines the azimuth and elevation angles of a target within the beam, but advantageously performs these functions with but two channels, namely a $\Sigma$ and a $\Delta$ channel, rather than with three channels, as in the prior art. By so doing, the complexity of the analog beamformer can be reduced, since it requires only two beam output ports rather than three, and one RF receiver, one IF receiver, and one ADC can be dispensed with. In the context of the "digital" arrangement of FIG. 2, the amount of hardware such as RF and IF receivers and ADCs remains the same for a given number of antenna elements in the array, but one of the two difference-channels of waveform processing may be eliminated. The signal processing may be as complicated or possibly even more complicated, but processing speeds and capabilities are expected to increase in the future, with the result that it may be advantageous to trade less hardware for more processing. Essentially, the information relating to one of the azimuth and elevation difference signals is encoded onto the real portion of a complex signal which is processed through the single difference channel, while the information relating to the other one of the azimuth and elevation difference signals is encoded onto the imaginary portion of the complex signal.

Figure 1:
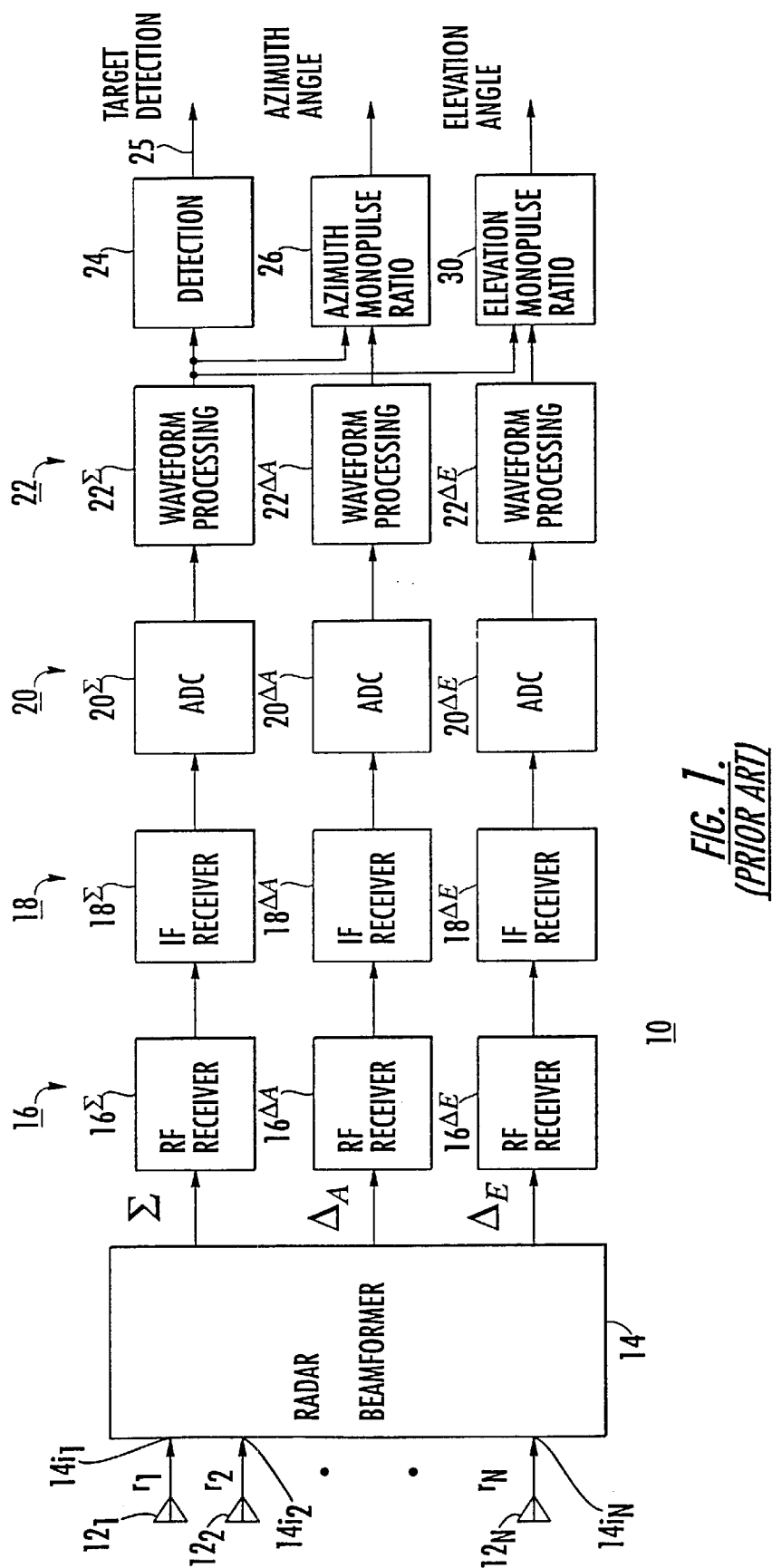
FIG. 1 is a simplified block diagram of a prior-art "analog" monopulse radar system.
Figure 4:
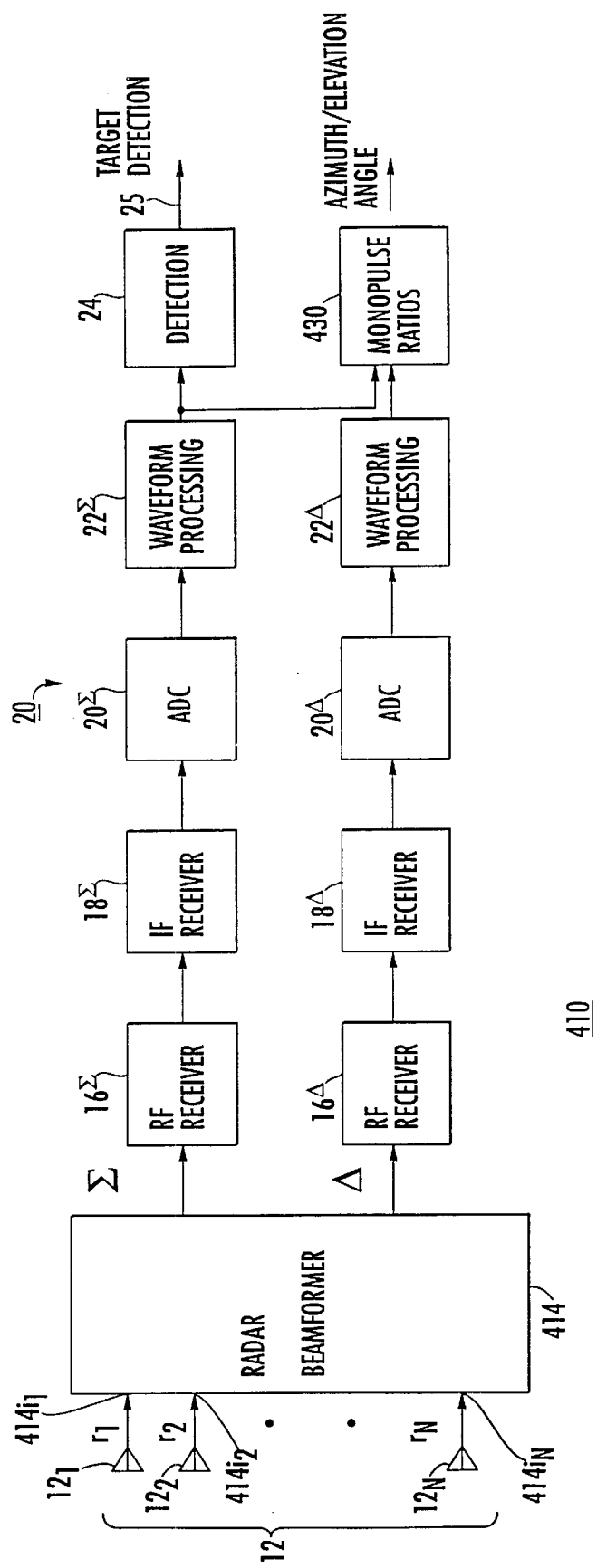
FIG. 4 is a simplified block diagram of a radar system receiving arrangement according to an aspect of the invention, using an "analog" beamformer.

FIG. 4 is a simplified block diagram of a receiving portion of an "analog" radar receiver according to an aspect of the invention. In FIG. 4, elements corresponding to those of FIG. 1 are designated by like reference numerals. In FIG. 4, the set 12 of antenna elements is identical to that of FIG. 1. The analog beamformer is designated 414 to indicate that it differs from the beamformer 14 of FIG. 1, at least because it has but two output beam ports, namely a $\Sigma$ and a $\Delta$ port. The sum ($\Sigma$) signal produced at the $\Sigma$ beam port by beamformer 414 is applied to a sum channel identical to that of FIG. 1, not further described. The difference signal produced by beamformer 414 of FIG. 4 is different from either of the difference signals produced by beamformer 14 of FIG. 1, in that the single difference signal of FIG. 4 includes the information encoded onto two separate difference signals in FIG. 1. The difference signal ($\Delta$) signal is applied from the $\Delta$ beam port of beamformer 414 to an RF receiver $16^\Delta$, and thence to an IF receiver $18^\Delta$ and an ADC $20^\Delta$, all essentially identical to those of either difference channel of FIG. 1. From ADC block $20^\Delta$, the digital signal is applied to waveform processing represented as a block $22^\Delta$. From block $22^\Delta$, the signal passes to a block 430, representing the extraction of the two portions (azimuth and elevation portions) of the difference signal information from the difference channel signal, and the taking of the ratios of the azimuth and elevation difference signals to the sum signal, to produce the desired azimuth and elevation angle signals.

Figure 5:
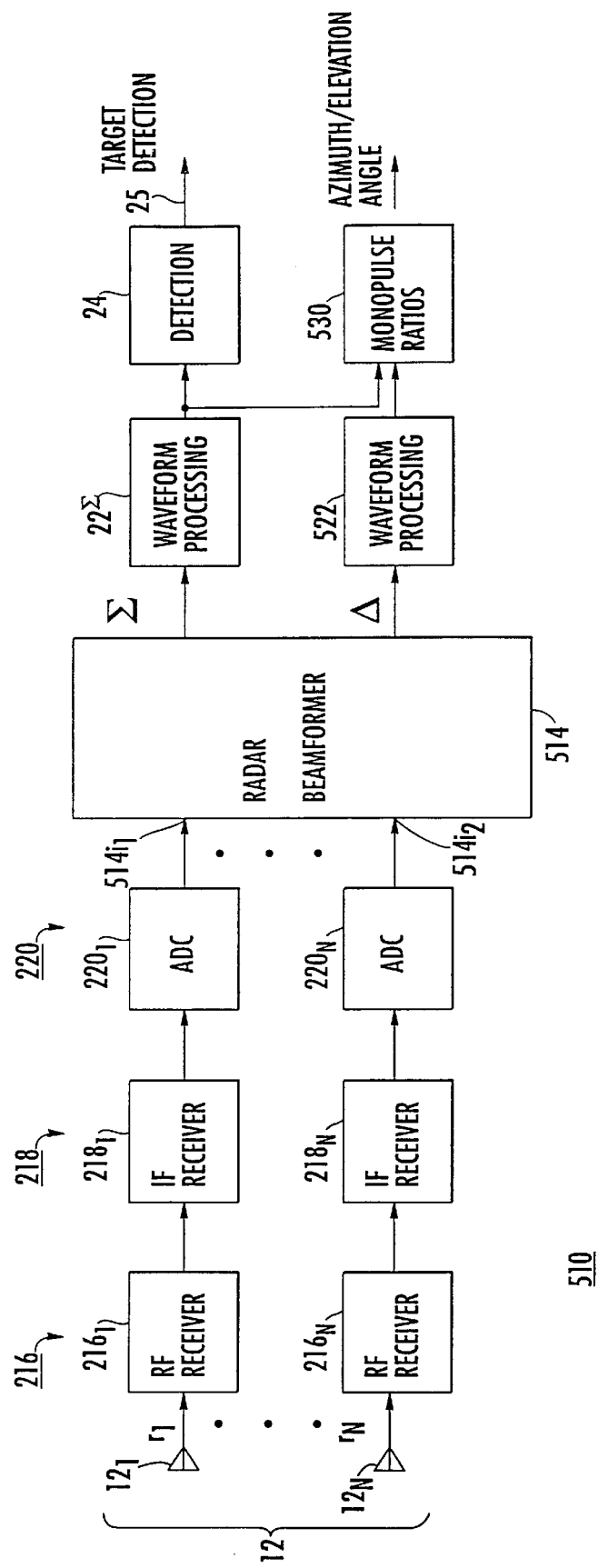
FIG. 5 is a simplified block diagram of a radar system receiving arrangement according to an aspect of the invention, using a "digital" beamformer.

FIG. 5 is a simplified block diagram of a "digital" radar return signal receiver. In FIG. 5, the set 12 of antenna elements, the set 216 of RF receivers, the set 218 of IF receivers, and the set 220 of ADCs is the same as in FIG. 2, and the corresponding elements are designated by like reference numerals. Digital beamformer 514 receives the same N digital input signals as the corresponding beamformer 214 of FIG. 2, but is designated 514 to indicate that it performs different processing to produce two, rather than three beams, namely a $\Sigma$ and $\Delta$ beam, where the $\Delta$ beam signal produced by the beamformer 514 at the $\Delta$ beam output port includes information from which both the azimuth and elevation angle of the target can be determined. The $\Sigma$ beam output of beamformer 514 of FIG. 5 is identical to that of beamformer 214 of FIG. 2, and it is processed in the same manner by waveform processing in a block $22^\Sigma$ and threshold or target detection in a block 24. The $\Delta$ beam output of beamformer 514 is applied to waveform processing in a block 522. The azimuth difference signal information ($\Delta A$) and elevation difference signal information ($\Delta E$) are extracted from the difference signal ($\Delta$) in block 530, the ratios are extracted, and the azimuth and elevation angles determined.

According to an aspect of the invention, the azimuth difference and elevation difference signals are combined into one beam in the beamformer so that $$\Delta = \sum_{k=1}^{N} w_\Delta(k) r(k) \quad (1)$$

with beamformer weights given by $$W_\Delta = W_{\Delta A} + j W_{\Delta E} \quad (2)$$

in which case the antenna pattern of the difference channel will be $$g_\Delta(T_x, T_y) = g_{\Delta A}(T_x, T_y) + j g_{\Delta E}(T_x, T_y) \quad (3)$$

In blocks 430 or 530 of FIG. 4 or 5, respectively. the quotient of the difference beam divided by the sum beam will generate a complex monopulse ratio $$m = \frac{\Delta}{\Sigma} = m_A + j m_E \quad (4)$$

from which the azimuth and elevation monopulse ratios can be directly extracted as the real and imaginary portions of m. Thus, it is only necessary to take a single ratio of $\Delta/\Sigma$, and both the angles are available.

Figure 2:
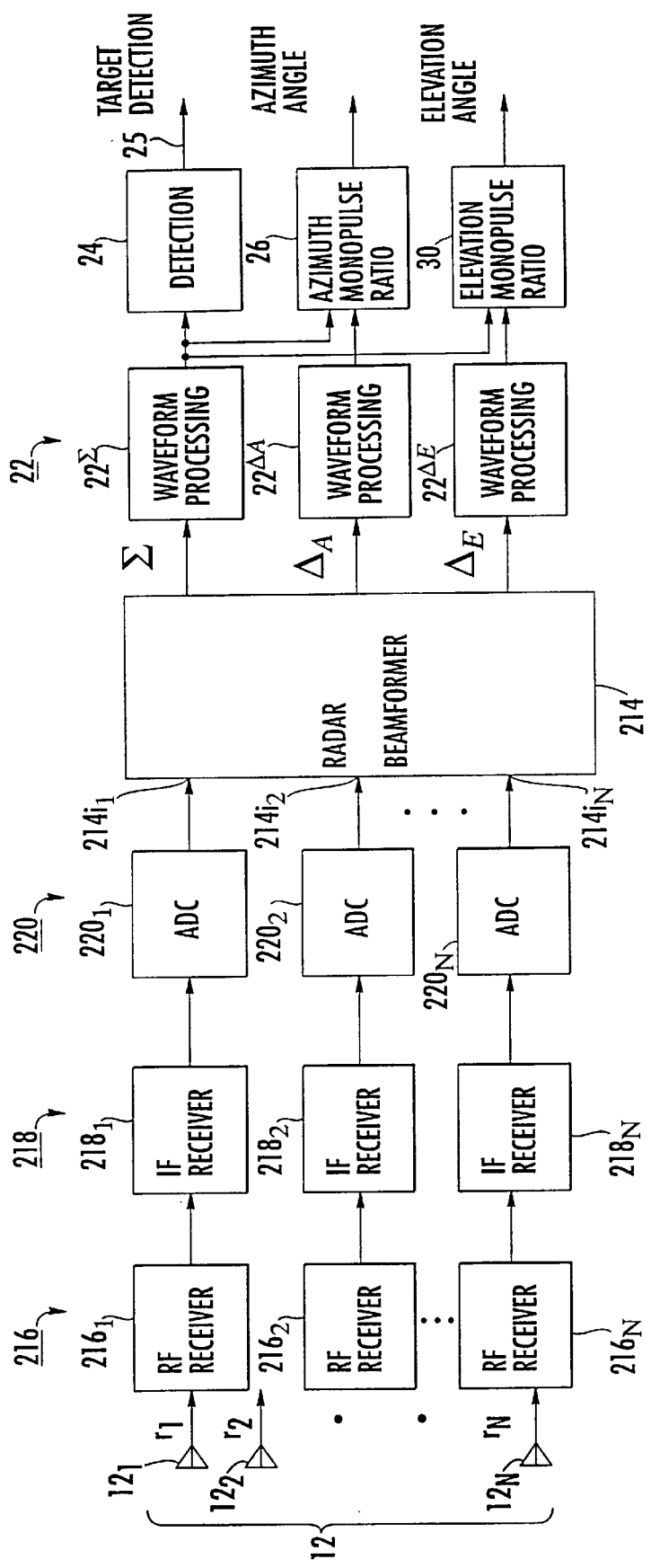
FIG. 2 is a simplified block diagram of a prior-art "digital" monopulse radar system.
Figure 3:
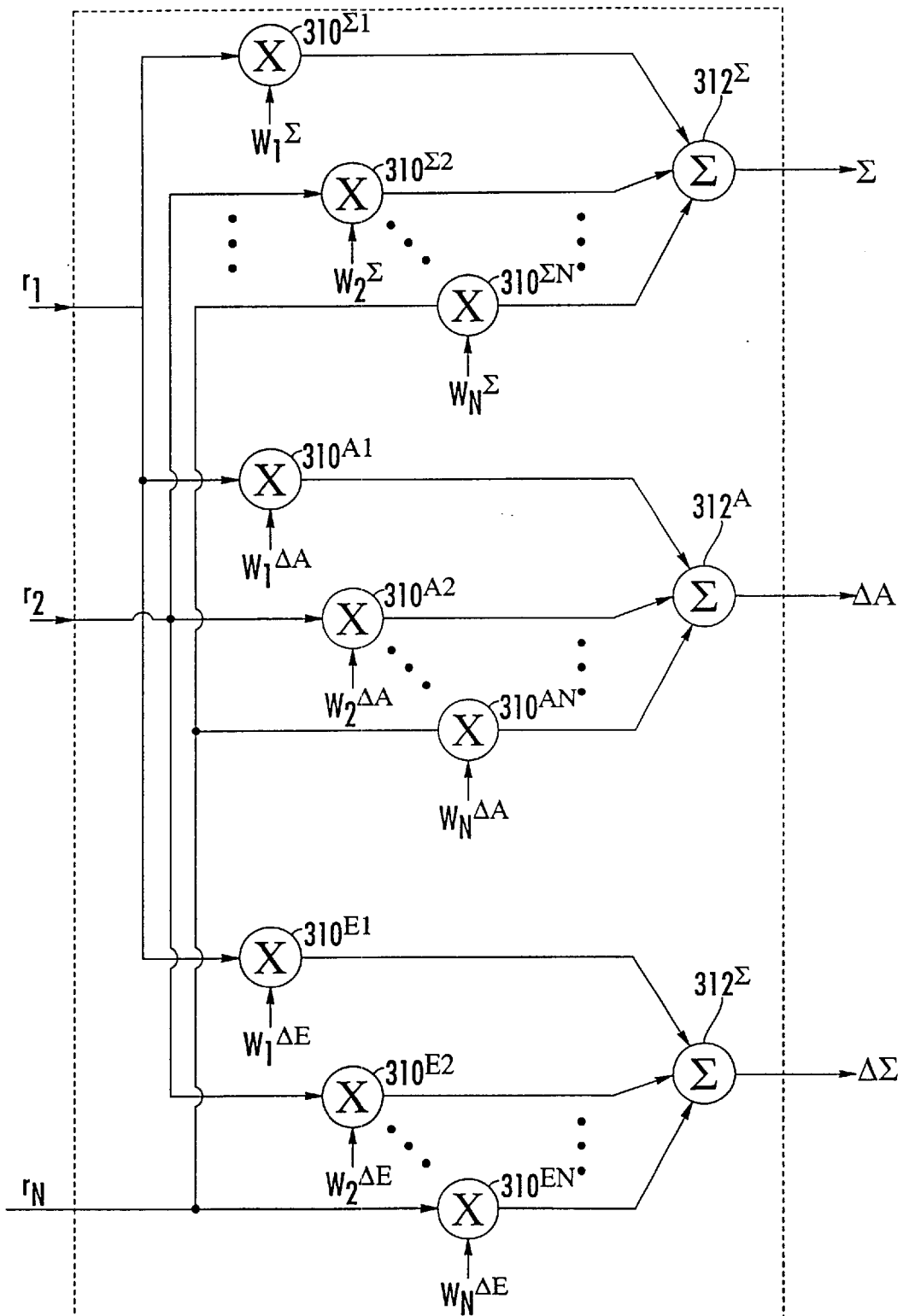
FIG. 3 is a simplified schematic diagram illustrating some of the principles on which a beamformer of FIG. 1 or 2 operates.
Figure 6A:
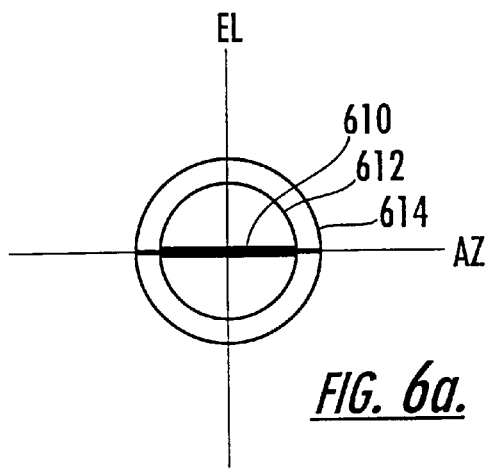
FIGS. 6a and 6b represent a boresight view or pattern of the nulls in an elevation difference signal and an elevation cut through the pattern showing the lobe structure adjacent the nulls, respectively.
Figure 6B:
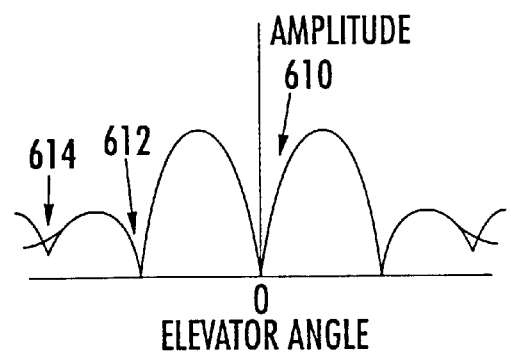
Figure 7A:
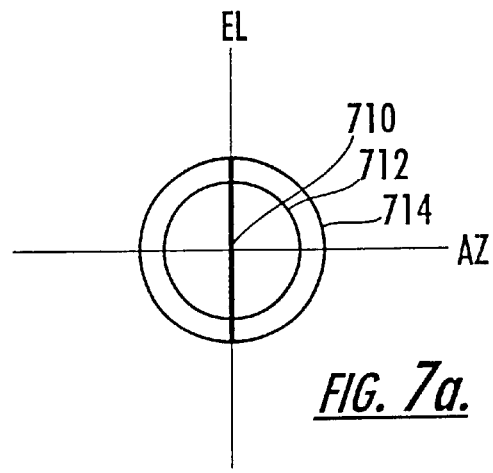
FIGS. 7a and 7b represent a boresight view or pattern of the nulls in an azimuth difference signal and an azimuth cut through the pattern showing the lobe structure adjacent the nulls, respectively.
Figure 7B:
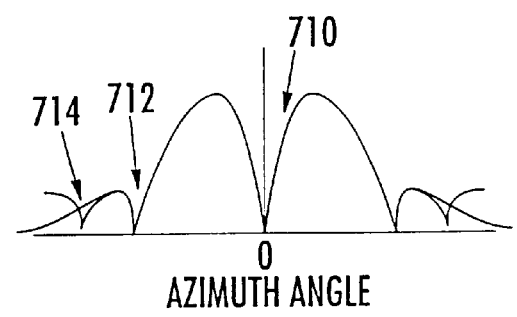
Figure 8:
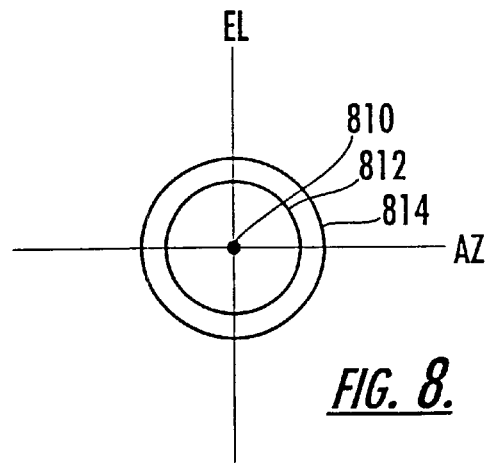
FIG. 8 represents a boresight view of an antenna beam or pattern of the nulls in a difference beam according to an aspect of the invention.

FIG. 7a represents the pattern of a circular Bayliss elevation difference antenna beam such as might be made by a structure such as that of FIG. 1 or 2. The boresight of the beam is represented by the intersection of the Az and El axes. In FIG. 7a, the principal null is represented by a line 610 lying parallel with and overlying the Azimuth axis. Two semicircular nulls are illustrated as 612 and 614. FIG. 6b represents a cut through the beam of FIG. 6a on the elevation axis. As illustrated, the principal null occurs at 0°, and ancillary nulls occur at constant spatial angles from the boresight. FIG. 7a represents the pattern of a circular Bayliss azimuth difference antenna beam such as might be made by a structure such as that of FIG. 1 or 2. As in the case of FIG. 6a, the boresight of the beam is represented by the intersection of the Az and El axes. In FIG. 7a, the principal null is represented by a line 710 lying parallel with and overlying the elevation axis. Two semicircular nulls are illustrated as 712 and 714. FIG. 7b represents a cut through the beam of FIG. 7a on the azimuth axis. As illustrated, the principal null occurs at 0°, and ancillary nulls occur at constant spatial angles from the boresight. The difference antenna beam according to the invention is illustrated in FIG. 8. As illustrated therein, there is a central point null 810, surrounded by two circular nulls 712 and 714. Thus, the difference beam according to the invention is circularly symmetric about its boresight, unlike either the $\Sigma$ or $\Delta$ difference beams generated by the prior art arrangements of FIG. 1 or 2.

Thus, a radar return signal detection system (410, 510) according to an aspect of the invention is for determining the presence of a target, and for determining the azimuth and elevation angles of arrival of the return signal from the target (relative to the boresight of the beam). The radar system includes an array (12) of receiving antenna elements or elemental antennas ($12_1, 12_2, \ldots 12_N$) for receiving the return signal. This array (12) is preferably a two-dimensional array of elemental antennas. The system also includes a combination of (a) analog-to-digital conversion means (20, 220) and (b) a beamformer (414, 514). The combination (20, 414; 220, 514) is coupled to each of the antenna elements ($12_x$ where x represents any index from 1 to N) for receiving signals representative of the return signal. The combination (20, 414; 220, 514) also includes two beamforming ports ($\Sigma$, $\Delta$) at which digital first and second signals are produced, with the first signal representing a sum ($\Sigma$) beam and the second signal representing a difference ($\Delta$) beam. The second signal is in the form of a complex number (R+jX) in which the azimuth difference and the elevation difference information are encoded. The system also includes digital sum signal processing means ($22^\Sigma$,24) coupled to the combination (20, 414; 220, 514) for receiving the first signal, and for generating (at output port 25) a sum signal indication (target present or absent) for determining the presence or absence of a target. A digital difference signal processing means ($22^\Delta$,430; 522, 530) is coupled to the combination (20, 414; 220, 514) for receiving the complex number, and for processing the first signal with the complex number to produce the azimuth and elevation angles. In a particularly advantageous embodiment of the invention, the complex number is divided by the sum signal to produce a further complex number in which the real component corresponds to the azimuth monopulse ratio, and in which the imaginary component corresponds to the elevation monopulse ratio.

In one embodiment of the invention, the beamformer (414, 514) is an analog beamformer (414) for receiving analog signals from the antenna elements ($12_1, 12_2, \ldots 2_N$) and for producing the first and second signals in analog form, and the analog-to-digital conversion means (20, 220) comprises first and second analog-to-digital converters coupled to the beam output ports ($\Sigma$, $\Delta$) of the analog beamformer (414) for converting the analog first and second signals into digital form.

In another embodiment of the invention, the analog-to-digital conversion means (20, 220) comprises a plurality of analog-to-digital converters ($216_1, \ldots, 216_N$) equal in number to the number of the receiving antenna elements in the array, with each of the analog-to-digital converters ($216_1, \ldots, 216_N$) coupled to one of the receiving antenna elements, for converting analog signals received by each of the receiving antenna elements into digital form. In this embodiment, the beamformer (514) is a digital beamformer coupled to the outputs of the plurality of analog-to-digital converters, for generating the digital first and second signals from the digital signals produced by the analog-to-digital converters.

U.S. Pat. Nos. 4,088,997and 3,714,652 refer to single channel monopulse radar systems, but differ in implementation, technology, and method from that described herein.

What is claimed is:

1. A radar return signal detection system for determining the presence of a target and for determining the azimuth and elevation angles of arrival of the return signal from the target, said radar system comprising:

an array of receiving antenna elements for receiving said return signal:

a combination of analog-to-digital conversion means and a beamformer, said combination being coupled to each of said antenna elements for receiving signals representative of said return signal, said combination including two beamforming ports at which digital first and second signals are produced, said first signal representing a sum beam and said second signal representing a difference beam, said second signal being in the form of a complex number in which the azimuth difference information is encoded as one of real and imaginary components of said complex number and the elevation difference information is encoded as the other one of said real and imaginary components of said complex number;

digital sum signal processing means coupled to said combination for receiving said first signal, and for generating a sum signal indication for determining the presence or absence of the target;

digital difference signal processing means coupled to said combination for receiving said complex number, and for combining said first signal with said real component of said complex number to produce one of said azimuth and elevation angles, and for combining said first signal with said imaginary component of said complex number to produce the other one of said azimuth and elevation angles.

2. A system according to claim 1, wherein, in said combination:

said beamformer is an analog beamformer for receiving analog signals from said antenna elements and for producing said first and second signals in analog form; and said analog-to-digital conversion means comprises first and second analog-to-digital converters coupled to said analog beamformer for converting said analog first and second signals into digital form.

3. A system according to claim 1, wherein, in said combination:

said analog-to-digital conversion means comprises a plurality of analog-to-digital converters equal in number to the number of said receiving antenna elements in said array, each of said analog-to-digital converters being coupled to one of said receiving antenna elements, for converting analog signals received by each of said receiving antenna elements into digital form; and said beamformer is a digital beamformer coupled to said plurality of analog-to-digital converters, for generating said digital first and second signals from said digital form produced by said analog-to-digital converters.

* * * * *